(12) United States Patent
Komoto

(10) Patent No.: US 6,411,135 B2
(45) Date of Patent: Jun. 25, 2002

(54) CLOCK SIGNAL SWITCHING CIRCUIT

(75) Inventor: Eiji Komoto, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/854,503

(22) Filed: May 15, 2001

(30) Foreign Application Priority Data

May 19, 2000 (JP) ........................................ 2000-147926

(51) Int. Cl.$^7$ ................................................ H03K 17/00
(52) U.S. Cl. ........................ 327/99; 327/166; 327/298; 327/407
(58) Field of Search ........................ 327/99, 165, 166, 327/291, 294, 298, 407, 218, 18, 20, 100; 326/93, 94, 96; 331/49

(56) References Cited

U.S. PATENT DOCUMENTS

| 5,274,678 A | * | 12/1993 | Ferolito et al. ............. 327/141 |
| 5,315,181 A | * | 5/1994 | Schowe ........................ 326/93 |
| 5,502,409 A | * | 3/1996 | Schnizlein et al. ......... 327/217 |
| 6,239,626 B1 | * | 5/2001 | Chesavage .................. 327/147 |

* cited by examiner

*Primary Examiner*—Kenneth B. Wells
*Assistant Examiner*—Minh Nguyen
(74) *Attorney, Agent, or Firm*—Junichi Mimura

(57) ABSTRACT

A clock signal switching circuit that switches between two clock signals having a phase difference. The clock signal switching circuit includes a first selector that selects one of the clock signals according to the level of a selection signal, a second selector that selects one of first and second control signals according to the level of the selection signal. The level of the first and second control signals are changed in response to an original signal and the first or the second clock signal. A gate circuit generates the output signal from the first and second selectors wherein the level of the selection signal is changed in response to the original signal after the levels of both of the first and second control signals have changed.

6 Claims, 4 Drawing Sheets

CLOCK SIGNAL SWITCHING CIRCUIT

CROSS-REFERENCE TO RELATED APPLICATION

This application claims the priority benefit of Japanese Patent Application No. 2000-147926, filed May 19, 2000, the entire disclosure of which is incorporated herein by reference.

BACKGROUND OF THE INVENTION

1. Field of the Invention

The invention relates to a clock signal switching circuit and, more specifically, to a clock signal switching circuit that can switch between clock signals without generating noise such as a hazard.

2. Description of the Related Art

FIG. 6 shows a circuit diagram of a clock signal switching circuit 100 in a related art. The clock signal switching circuit 100 includes a two-input and one-output selector 1 wherein two kinds of clock signals CK1 (a first signal) and CK2 (a second clock signal), each of which has a unique clock signal form, are provided at its input terminals. The output of the selector 1 is connected to an input terminal of a driver 2. The selector 1 selects one of the first and second clock signals CK1 and CK2 according to the logic level of a selection signal SL, and generates the selected signal. The driver 2 activates the selected signal, and generates the activated signal as the clocked signal CKo.

FIG. 7 is a signal timing chart showing the operation of the clock signal switching circuit 100 illustrated in FIG. 6. As described above, the first and second clock signals CK1 and CK2 are provided to the selector 1. When a section signal SL at an L level (a second logic level), is applied to the selector 1, the first clock signal CK1 is selected. When a section signal SL at an H level (a first logic level), is applied to the selector 1, the second clock signal CK2 is selected. Then, the selected signal is provided to the driver 2 to be activated therein. After activating the selected signal, the clocked signal CKo is generated from the driver 2. As further described above, the clock signal switching circuit 100 illustrated in FIG. 6 switches between the first and second clock signals CK1 and CK2 by the selector 1 according to the logic level of the selection signal SL, and activates the selected signal CK1 or CK2 by the driver 2.

However, since the phases of the first and second clock signals CK1 and CK2 are different, noise such as a hazard hd, which is shown in FIG. 7, appears on the clocked signal CKo when the first and second clock signals are switched according to the logic level of the selection signal SL. When the hazard appears on the clocked signal CKo, the hazard may be a trigger for malfunctioning of all circuits, which are controlled by the clocked signal CKo.

SUMMARY OF THE INVENTION

It is therefore an objective of the invention to resolve the above-described problem and to provide a clock signal switching circuit that provides a clocked signal without generating any hazards when the clock signals are switched.

The objective is achieved by a clock signal switching circuit, which receives at least two clock signals having a phase difference between them, and an original signal for switching between the clock signals, and generates an output signal by selecting one of them. The clock signal switching circuit includes a detection circuit receiving the original signal, the detection signal forming a detection signal when a transition between a first and a second logic level of the original signal is received, a delay circuit receiving the original signal and the detection signal, the delay circuit passing through the original signal when the original signal maintains its logic level, and the delay circuit outputting a selection signal when the detection circuit receives the detection signal, a first selector receiving the clock signals, selecting one of the clock signals according to the logic level of the selection signal, and outputting a first selected signal, a second selector receiving a first control signal and a second control signal, selecting one of the control signals according to the logic level of the selection signal, and outputting a second selected signal, the first control signal changing in response to one of the clock signals and the detection signal, and the logic level of the second control signal changing in response to the other clock signal and the detection signal, and a gate circuit receiving the first and second selected signal, generating the output signal wherein the logic level of the selection signal is changed by the delay circuit after the logic level of both of the first and second control signals has changed.

Further, the objective is achieved by a clock signal switching circuit that receives two clock signals having a phase difference between them, and a selection signal for switching between the clock signals, and generates an output signal by switching between the clock signals according to the logic level of a switch signal. The clock signal switching circuit includes a first output control circuit receiving the selection signal and the first clock signal, the first output control circuit outputting a first signal having a fixed logic level in synchronism with the raising transition of the first clock signal when the selection signal is at a first logic level, and the first output control circuit outputting the first signal, which is the same as the first clock signal, when the selection signal is at a second logic level, maintaining the first signal which is the same as the first clock signal for a particular period staring when the logic level of the selection signal is change and ending when the first clock signal goes up, a second output control circuit receiving the selection signal and the second clock signal, the second output control circuit outputting a second signal, which is the same as the second clock signal, in synchronism with the raising transition of the second clock signal when the selection signal is at a first logic level, and the second output control circuit outputting the second signal having a fixed logic level when the selection signal is at a second logic level, and, maintaining the second signal having the fixed logic level for a particular period staring when the logic level of the selection signal is change and ending when the second clock signal goes up, a switch signal generating circuit, which receives the first and second clock signals and the selection signal, generating a switch signal, the switch signal generating circuit outputting the switch signal in response to the transition of the logic level of either the first or the second clock signal after the logic level of the selection signal is changed, and a selector selecting and outputting one of the first and second signal according to the logic level of the switch signal as the output signal.

The above and further objects and novel features of the invention will more fully appear from the following detailed description, appended claims and accompanying drawings.

DETAILED DESCRIPTION OF THE PREFERRED EMBODIMENTS

The concept of the invention is as follows. Even if a clock signal switching circuit receives an original signal for switching between two clock signals, the clock signal switching circuit maintains the output level of a clock signal, which is previously selected, for particular period. Then, the clock signal switching circuit actually switches between the clock signals at a particular timing.

First Preferred Embodiment

Figure 1:
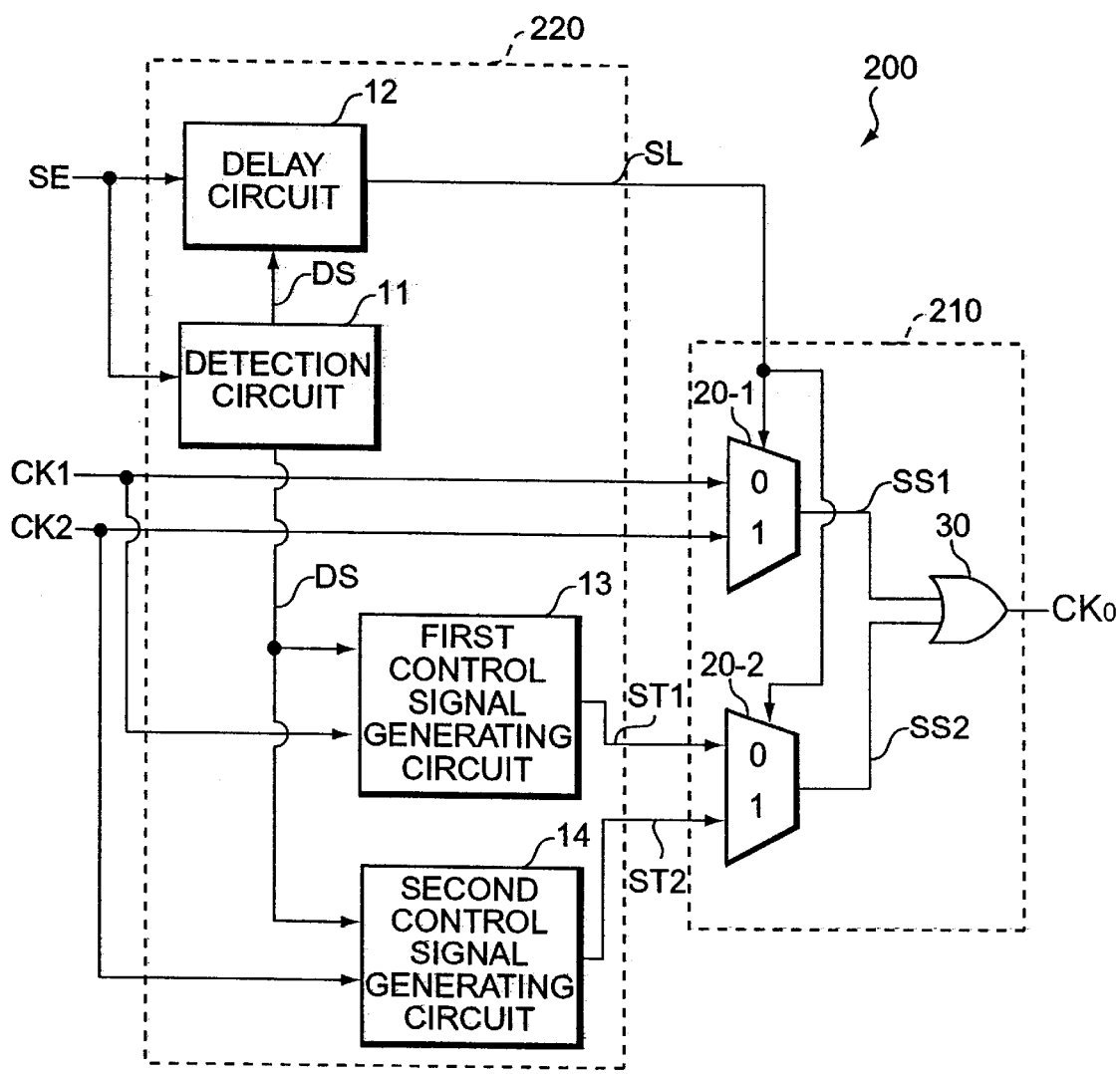
FIG. 1 is a circuit diagram of a clock signal switching circuit according to a first embodiment of the invention.
Figure 6:
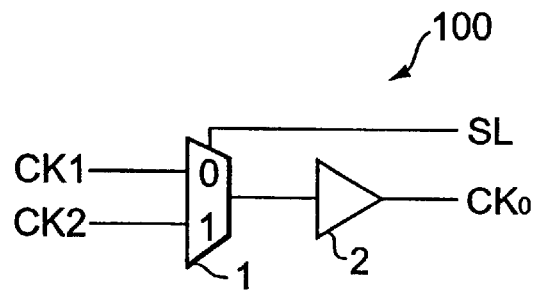
FIG. 6 is a circuit diagram of a clock signal switching circuit in the related art.
Figure 7:
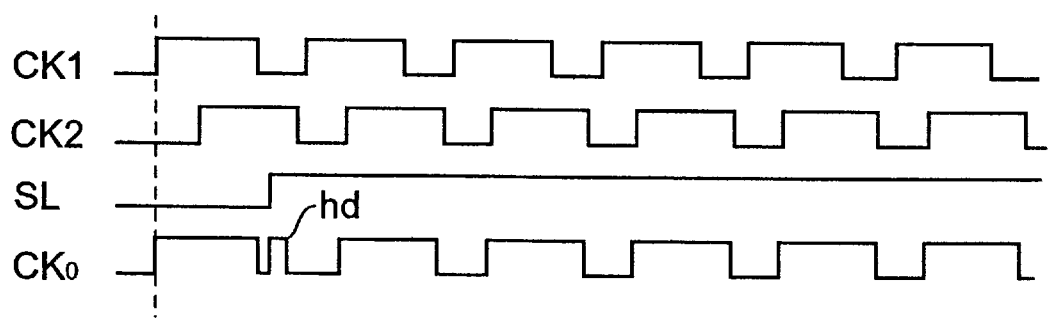
FIG. 7 is a timing chart showing the operation of the clock signal switching circuit shown in FIG. 6.

A clock signal switching circuit 200 according to a first embodiment of the invention switches from a first clock signal CK1 to a second clock signal CK 2. Referring to FIG. 1, the clock signal switching circuit 200 includes a selection circuit 210 and a control signal generating circuit 220 providing several clocked signals to the selection circuit 210. The control signal generating circuit 220, which is composed of central processing units and other components, includes a detection circuit 11, a delay circuit 12 connected to the detection circuit 11, and first and second control signal generating circuits 13 and 14. The first control signal generating circuit has two inputs and one output and generates a first control signal ST1. The second control signal generating circuit 14 also has two inputs and one output and generates a second control signal ST2. The detection circuit 11 receives an original signal SE having an H level (a first logic level) and an L level (a second logic level) in order to switch between the first and second clock signals CK1 and CK2. When the detection circuit 11 detects a transition of the original signal SE from the second logic level (L level) to the first logic level (H level) or from the first logic level (H level) to the second logic level (L level), the detection circuit 11 outputs a detection signal DS to the first control signal generating circuit 13, the second control signal generating circuit 14 and the delay circuit 12. The delay circuit 12 delays the transition for a particular period in response to the detection signal DS, and outputs a selection signal SL having the delayed transition. While the delay circuit 12 is not receiving the detection signal DS, the original signal SE simply passes through the delay circuit 12.

The output of the detection circuit 11 is connected to one of the two inputs of the first control signal generating circuit 13, and is connected to one of the two inputs of the second control signal generating circuit 14. The first clock signal CK1 is provided to the other input of the first control signal generating circuit 13, and the second clock signal Ck2 is provided to the other input of the second control signal generating circuit 14. The first control signal generating circuit 13 outputs the first control signal ST1, which goes up to the first logic level (H level) at a time T1 in response to the detection signal DS, and which remains at the first logic level (H level) for a particular period, and which falls to the second logic level (L level) at a time T4 after the selection signal SL indicates the transition which is delayed by the delay circuit 12. The second control signal generating circuit 14 outputs the second control signal ST2, which goes up to the first logic level (H level) at a time T2 in response to the detection signal DS, and which remains at the first logic level (H level) for a particular period, and falls to the second logic level (L level) at a time T5 after the selection signal SL indicates the transition, which is delayed by the delay circuit 12. Therefore, the timings with which the second control signal ST2 goes up to the first logic level (H level) and falls to the second logic level (L level), are delayed for a particular period equal to the phase difference between the first and second clock signals CK1 and CK2 from the time at which the first control signal ST1 goes up to the H level and falls to the L level. The delay time and the period of maintaining the first and second control signals CK1 and CK2 at the H level are determined by the numbers of clock pulses of the first or second clock signal CK1 or CK2.

The selection circuit 210 of the clock signal switching circuit 200 includes a first selector 20-1, a second selector 20-2 and a gate circuit 30. The first selector 20-1 includes two data-inputs for receiving the first and second clock signals CK1 and CK2 and one data-output, and selects and outputs one of the first and second clock signals CK1 and CK2 as a first selected signal SS1 according to the logic level of the selection signal SL. The second selector 20-2 includes two data-inputs for receiving the first and second control signals ST1 and ST2 and one data-output, and selects and outputs one of the first and second control signals ST1 and ST2 as a second selected signal SS2 according to the logic level of the selection signal SL. The gate circuit 30, such as a two-input and one-output OR gate, has a logical sum function. The first selector 20-1 selects the first clock signal CK1 and outputs the first clock signal CK1 as the first selected signal SS1 to one input of the gate circuit 30, when the selection signal SL having the second logic level (L level) is applied to the first selector 20-1. The first selector 20-1 selects the second clock signal CK2 and outputs the second clock signal CK2 as the first selected signal SS1 to the one input of the gate circuit 30, when the selection signal SL having the first logic level (H level) is applied to the first selector 20-1. The second selector 20-2 selects the first control signal ST1 and outputs the first control signal ST1 as the second selected signal SS2 to the other input of the gate circuit 30, when the selection signal SL having the second logic level (L level) is applied to the second selector 20-2. The second selector 20-2 selects the second control signal ST2 and outputs the second control signal ST2 as the second selected signal SS2 to the other input of the gate circuit 30, when the selection signal SL having the first logic level (H level) is applied to the second selector 20-2.

The gate circuit 30 outputs a clocked signal CKo. The clocked signal CKo is formed as follows. The gate circuit 30 transfers the first selected signal SS1 from the first selector 20-1 when the second selected signal SS2 from the second selector 20-2 is at the second logic level (L level) because the gate circuit 30 is in an open-state in this condition. Therefore, in this situation, the first selected signal SS1 generated by the first selector 20-1 is outputted from the gate circuit 30 as the clocked signal CKo. The gate circuit 30 hold its logic level at the predetermined level (the first logic level in the first embodiment) when the second selected signal SS2 from the second selector 20-2 is at the first logic level (H level) because the gate circuit 30 is in a close-state in this condition. Therefore, in this situation, the clocked signal CKo having the first level (H level) is generated by the gate circuit 30.

Figure 2:
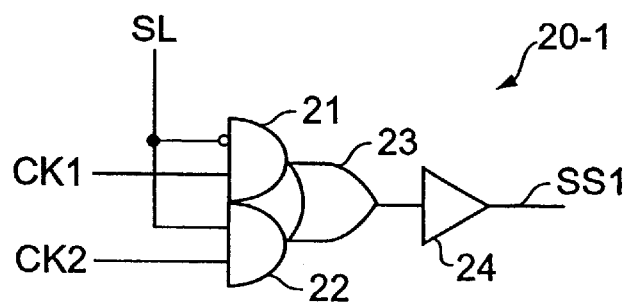
FIG. 2 is a logic circuit of the first selector shown in FIG. 1.

Referring to FIG. 2, the first selector 20-1 includes a first AND gate 21, a second AND gate 22, an OR gate 23 and a driver 24. The first AND gate 21 has two inputs and one output. One of the input is a reversed input so that a signal provided thereto is reversed at the reversed input. The second AND gate 22 has two inputs and one output. The OR gate 23 has two inputs and one output, and the outputs of the first and second AND gate are connected to the inputs of the OR gate 23, respectively. The output of the OR gate 23 is connected to the driver 24. The selection signal SL is provided to the reversed input of the first AND gate 21 and to the one of the two inputs of the second AND gate 22. The first clock signal CK1 is provided to the other input of the first AND gate 21, and to the other input of the second AND circuit 22.

In the first selector 20-1, when the selection signal SL having the second level (L level) is applied to the first and second AND gate 21 and 22, the first AND gate 21 is open and the second AND gate 22 is closed because the logic level of the selection signal SL is revered at the reversed input of the first AND gate 21. When the first AND gate 21 is open, a logical product operation based on the reversed signal of the selection signal SL and the first clock signal CK1 is performed. The result of the logical product operation is passed through the OR gate 23, and is activated by the driver 24. As a result, the first clock signal CK1 is outputted from the driver 24 as the first selected signal SS1. When the selection signal SL having the first level (H level) is applied to the first and second AND gates 21 and 22, the first AND gate 21 is close and the second AND gate 22 is opened because the logic level of the selection signal SL is reversed at the reversed input of the first AND gate 21. When the second AND gate 22 is open, a logical product operation based on the selection signal SL and the second clock signal CK2 is performed. The result of the logical product operation is passed through the OR gate 23, and is activated by the driver 24. As a result, the second clock signal CK2 is outputted from the driver 24 as the first selected signal SS1. The second selector 20-2 shown in FIG. 1 has the same structure as the first selector 20-1 shown in FIG. 2.

The operation of the clock signal switching circuit 200 illustrated in FIG. 1 is explained as follows with reference to FIG. 3. Two clock signals CK1 and CK2 having different phases are provided to the clock signal switching circuit 200. While the original signal SE maintains the second logic level (L level), the selection signal SL outputted from the delay circuit 12 maintains the second logic level (L level). The control signals ST1 and ST2, which are outputted from the first and second control generating circuits 13 and 14 respectively, also maintain the second logic levels (L level). Since the selection signal SL is at the second logic level (L Level), the first selector 20-1 selects the first clock signal CK1, and transfer the first clock signal CK1 to the gate circuit 30 as the first selected signal SS1. Also, the second selector 20-2 selects the first control signal ST1 having the second logic level (L level), and transfer the first control signal ST1 to the gate circuit 30 as the second selected signal SS2. Since the first control signal ST1 having the second logic level (L level) is provided to the gate circuit 30, the gate circuit 30 is opened, and then, the first clock signal CK1 as the first selected signal SS1 passes through the gate circuit 30. As a result, the first clock signal CK1 is outputted from the gate circuit 30 as the clocked signal CKo.

The logic level of the original signal SE is changed from the second logic level (L level) to the first logic level (H level) at the time T1. The detection circuit 11 detects the transition of the original signal SE, and sends the detection signal DS to the delay circuit 12, the first control signal generating circuit 13 and the second control signal generating circuit 14. When the first control signal generating circuit 13 receives the detection signal DS, the logic level of the first control signal ST1 outputted from the first control signal generating circuit 13 is changed from the second logic level (L level) to the first logic level (H level) in synchronism with the transition of the first clock signal CK1 from the second logic level (L level) to the first logic level (H level). Further, when the second control signal generating circuit 14 receives the detection signal DS, the logic level of the second control signal ST2 outputted from the second control signal generating circuit 14 is changed from the second logic level (L level) to the first logic level (H level) in synchronism with the transition of the second clock signal CK2 from the second logic level (L level) to the first logic level (H level). Accordingly, at the time T2, the logic level of the second selected signal SS2 from the second selector 20-2 is changed from the second logic level (L level) to the first logic level (H level). As a result, the gate circuit 30 is closed so that the logic level of the clocked signal CKo is fixed at the first logic level (H level). Therefore, the clocked signal CKo having the first logic level (H level) is outputted from the gate circuit 30.

When a particular period equal to few pulses has passed after both of the first and second control signals ST1 and ST2 go up, the logic level of the selection signal SL is changed from the second logic level (L level) to the first logic level (H level) by delaying the transition of the original signal SE caused by the delay circuit 12 at the time T3. When the selection signal SL goes up to the first logic level (H level), the first selector 20-1 selects and outputs the second clock signal CK2. Simultaneously, the second selector 20-2 selects and outputs the second control signal ST2. However, since the second selector 20-2 outputs the second control signal ST2 having the first logic level (H level), the gate circuit 30 maintains the closed state. Accordingly, the logic level of the clocked signal CKo outputted from the gate circuit 30 continues to be maintained at the first logic level (H level).

As described above, when the second clock signal CK2 is selected by the first selector 20-1, the gate circuit 30 is still closed because the logic level of the signal outputted from the second selector 20-2 remains at the first logic level (H level). Therefore, there is no hazard on the clocked signal CKo when the logic level of the selection signal SL is changed from the second logic level (L level) to the first logic level (H level). That is, since the selection signal SL is changed from the second logic level (L level) to the first logic level (H level) while the logic level of the second selected signal SS2 of the second selector 20-2 is fixed at the first logic level (H level), the hazard does not appears on the clocked signal CKo, which is outputted from the gate circuit 30.

After the selection signal SL for switching between the clock signals goes up, the first control signal ST1 is negated by the first control signal generating circuit 13 and falls to the second logic level (L level) at the time T4 in synchronism with the transition of the first clock signal CK1 from the second logic level (L level) to the first logic level (H level). Further, the second control signal ST2 is negated by the second control signal generating circuit 14 and falls to the second logic level (L level) at the time T5 in synchronism with the transition of the second clock signal CK2 from the second logic level (L level) to the first logic level (H level). Accordingly, the second selected signal SS2 of the second selector 20-2, which selects the second control signal ST2, falls to the second logic level (L level) at the time T5 so that the gate circuit 30 is opened. Since the first selector 20-1 is now selecting the second clock signal CK2, the second clock signal CK2 passes through the gate circuit 30, and is outputted from the gate circuit 30 as the clocked signal CKo. The switching operation of the clocked signal CKo from the first clock signal CK1 to the second clock signal CK2 is completed.

According to the first embodiment of the invention, since the first and second control signals ST1 and ST2 for holding the first and second clock signals CK1 and CK2 at the first logic level (H level) are generated by the control signal generating circuit 220, and are provided to the second selector 20-2, the following benefits can be expected.

(1) No hazard appears on the clocked signal CKo, which is outputted when the first clock signal CK1 is switched to the second clock signal CK2.

(2) Since the circuit structure of the clock signal switching circuit 200 of the first embodiment is relatively simple, the size of the clock signal switching circuit 200 is not dramatically increased, compared with that of the clock signal switching circuit of the related art.

(3) Since the control signal generating circuit 220 for controlling the switch operation is formed separately from the selection circuit 210, the clock signal switching circuit 200 can be applied to any situations, which require to switch between the clock signals. That is, the clock signal switching circuit 200 of the first embodiment has high flexibility to use.

Second Preferred Embodiment

Figure 4:
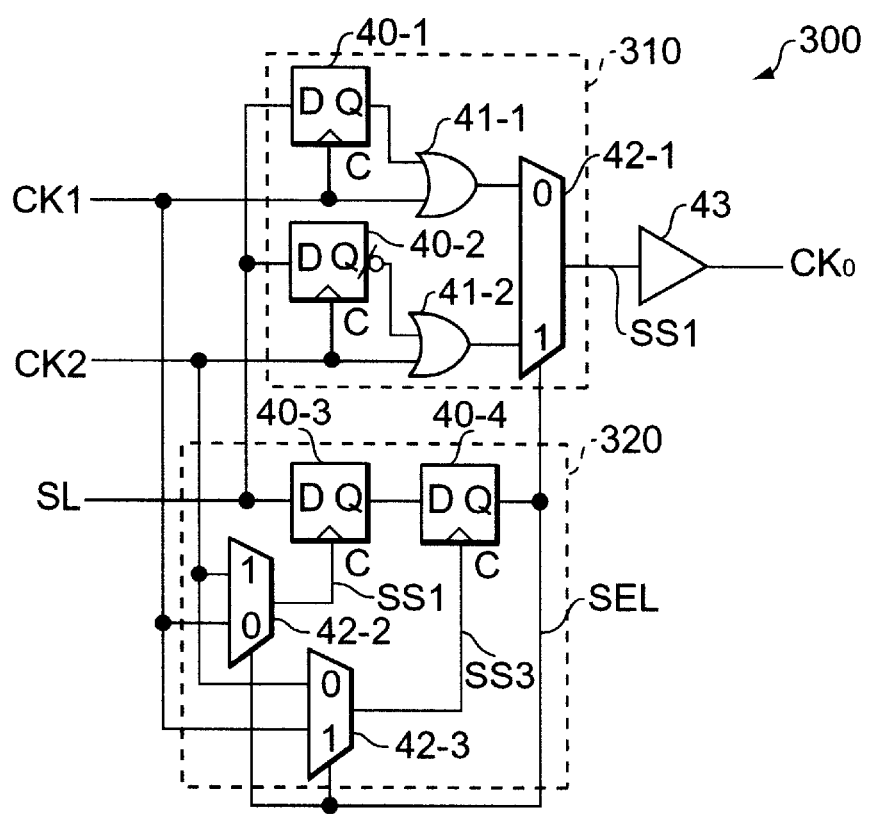
FIG. 4 is a circuit diagram of a selection circuit of a clock signal switching circuit according to a second embodiment of the invention.
Figure 5:
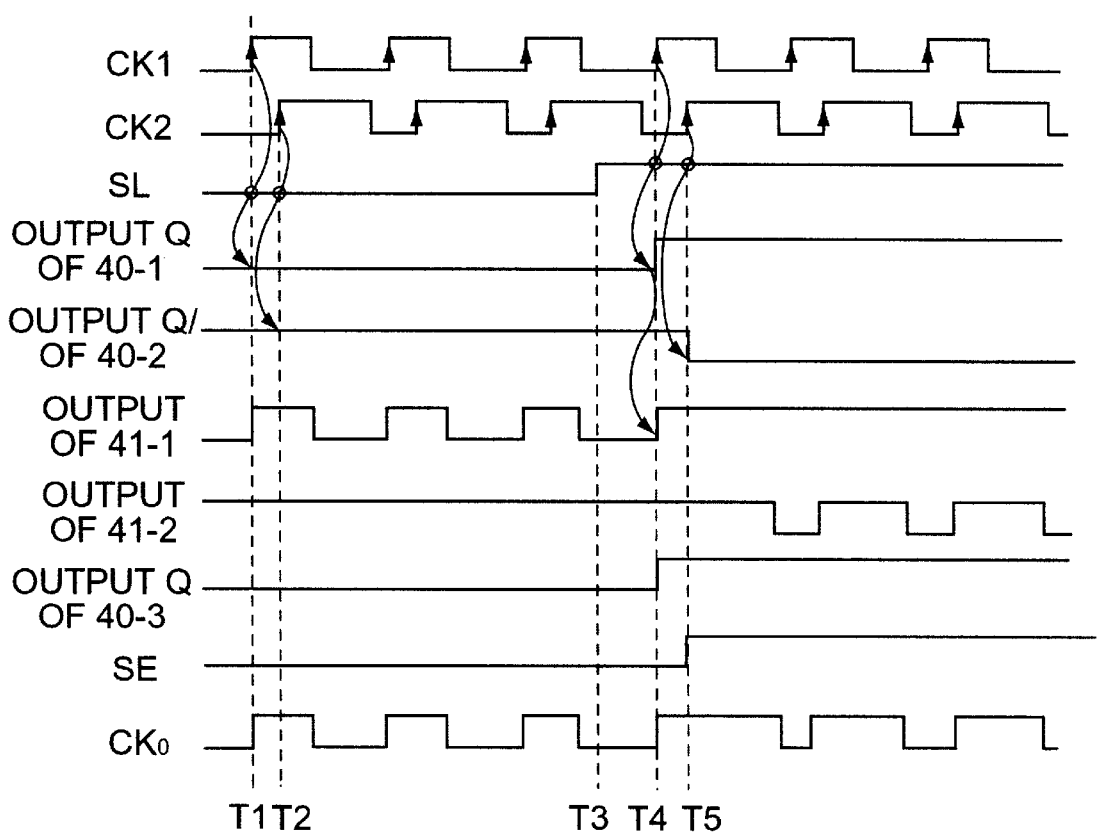
FIG. 5 is a timing chart showing the operation of the clock signal switching circuit shown in FIG. 4.

A clock signal switching circuit 300 according to a second embodiment of the invention selects one of a first clock signal CK1 and a second clock signal CK 2 according to the logic level of a selection signal SL, and then outputs a clocked signal CKo. Referring to FIG. 4, the clock signal switching circuit 300 includes a selection circuit 310 and a switch signal generating circuit 320 providing a switch signal SEL to the selection circuit 310.

The selection circuit 310 includes a first flip-flop circuit 40-1 such as a delay type flip-flop circuit ("first D-FF circuit") and a second flip-flop circuit 40-2 such as a delay type flip-flop circuit ("second D-FF circuit"). The first D-FF circuit 40-1 has a data input terminal D for receiving the selection signal SL, a clock signal input terminal C for receiving the first clock signal CK1 and an output terminal Q. The first D-FF circuit 40-1 latches the selection signal SL in synchronism with the transition of the clock signal CK1 from the second logic level (L level) to the first logic level (H level), outputs the latched selection signal SL and maintains the level of the selection signal SL until the next transition of the clock signal CK1 from the second logic level (L level) to the first logic level (H level). The second D-FF circuit 40-2 has a data input terminal D for receiving the selection signal SL, a clock signal input terminal C for receiving the second clock signal CK2 and a reverse output terminal Q/.

The selection circuit 310 has a first gate circuit 41-1, a second gate circuit 41-2, and a first selector 42-1 having two inputs and one output. The first gate circuit 41-1 such as a two-input and one-output OR gate, has logical sum function. One of two inputs of the first gate circuit 40-1 is connected to the output terminal Q of the first D-FF circuit 40-1, and the other input receives the first clock signal CK1. The second gate circuit 41-2 such as a two-input and one-output OR gate, has a logical sum function. One of two inputs of the second gate circuit 40-2 is connected to the reverse output terminal Q/ of the second D-FF circuit 40-2, and the other input receives the second clock signal CK2. The output of the first gate circuit 41-1 is connected to one of the inputs of the first selector 42-1, and the output of the second gate circuit 41-2 is connected to the other input of the first selector 42-1. The first selector 42-1 selects one of the signals that are generated by the first and second gate circuits 41-1 and 41-2 according to the logic level of a switch signal SEL, which is formed by the switch signal generating circuit 320. In this embodiment, the first selector 42-1 selects and outputs the output signal from the first gate circuit 41-1 as a first selected signal SS1, when the first selector 42-1 receives the switch signal SEL having the second logic level (L level). On the other hand, the first selector 42-1 selects and outputs the output signal from the second gate circuit 41-2 as the first selected signal SS1, when the first selector 42-1 receives the switch signal SEL having the first logic level (H level). The output of the first selector 42-1 is connected to a driver 43 for activating the first selected signal SS1 from the first selector 42-1, and the driver 43 outputs the selected signal as the clocked signal CKo.

The switch signal generation circuit 320 for forming the switch signal SEL from the selection signal SL includes a third D-FF 40-3, a fourth D-FF 40-4, a second selector 42-2 and a third selector 42-3. The third D-FF circuit 40-3 has a data input terminal D for receiving the selection signal SL, a clocked signal input terminal C and an output terminal Q. The fourth D-FF circuit 40-4 has a data input terminal D connecting to the output terminal Q of the third D-FF 40-3, a clocked signal input terminal C and an output terminal Q connecting to the first selector 42-1 of the selection circuit 310, to the second and third selector 42-2 and 42-3 to apply the switch signal SEL.

The second selector 42-2 includes two inputs for receiving the first and second clock signals CK1 and CK2, respectively and one output, which is connected to the clocked signal input terminal C of the third D-FF circuit 40-3. The third selector 42-3 includes two inputs for receiving the second and first clock signal CK2 and CK1, respectively and one output, which is connected to the clocked signal input terminal C of the fourth D-FF circuit 40-3. The first and second selector 42-2 and 42-3 are controlled by the switch signal SEL. The second selector 42-2 selects the second clock signal CK2, when the second selector 42-2 receives the switch signal SEL having the first logic level (H level), and the second selector 42-2 selects the first clock signal CK1, when the second selector 42-2 receives the switch signal SEL having the second logic level (L level). On the other hand, the third selector 42-3 selects the second clock signal CK2, when the third selector 42-3 receives the switch signal SEL having the second logic level (L level), and the third selector 42-3vselects the first clock signal CK1, when the third selector 42-3 receives the switch signal SEL having the first logic level (H level). The circuit structure of each of the first, the second and the third selectors 42 is the same as that of the first selector 20-1 of the first embodiment, which is shown in FIG. 2.

Figure 3:
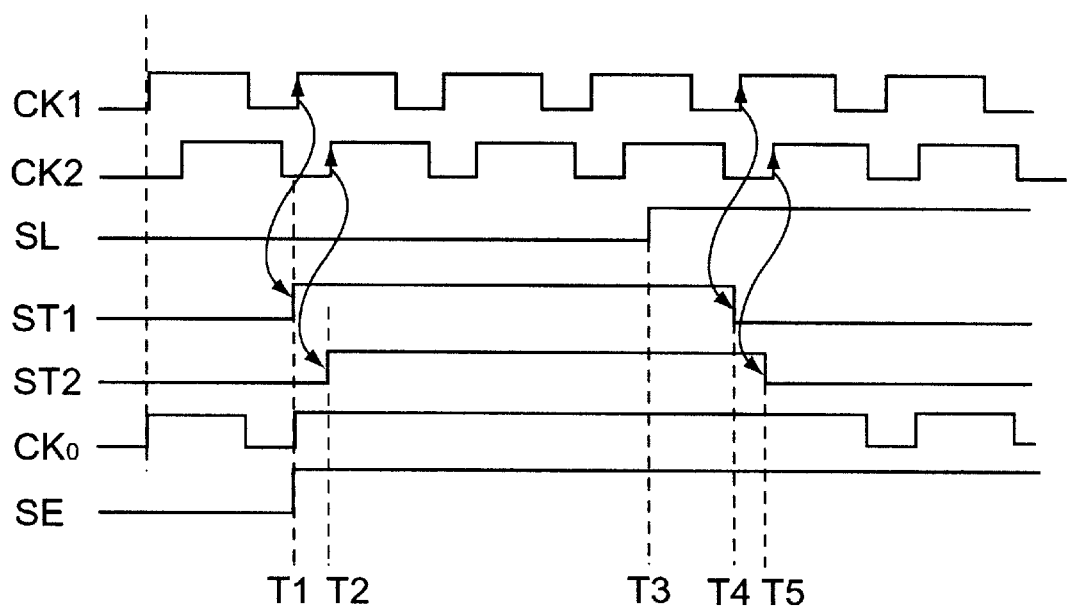
FIG. 3 is a is a timing chart showing the operation of the clock signal switching circuit shown in FIG. 1.

Referring to the FIG. 3, after the first trough the fourth D-FF circuits 40-1 –40-4 are reset by a reset signal, the first and second clock signals CK1 and CK2, which has a phase difference therebetween, are provided to the clock signal switching circuit 300. When the selection signal SL having the second logic level (L level) is provided to the clock signal switching circuit 300, the switch signal SEL having the second logic level (L level) is outputted from the output terminal Q of the fourth D-FF circuit 40-4. When the switch signal SEL having the second logic level (L level) is outputted, the first selector 42-1 selects the output signal of the first gate circuit 41-1 as the first selected signal SS1, the second selector 42-2 selects the first clock signal CK1 as the second selected signal SS2 and the third selector 42-3 selects the second clock signal CK2 as the third selected signal SS3.

At a time T1, the selection signal SL having the second logic level (L level) is latched at the data input terminal D of the first D-FF circuit 40-1 in synchronism with the transition of the first clock signal CK1 from the second logic level (L level) to the first logic level (H level) so that the output signal having the second logic level (L level) is outputted from the output terminal Q of the first D-FF circuit 40-1. Accordingly, the first gate circuit 41-1 is opened so that the first clock signal CK1 is transferred to the first selector 42-1. On the other hand, at a time T2, the selection signal SL having the second logic level (L level) is latched at the data input terminal D of the second D-FF circuit 40-2 in synchronism with the transition of the second clock signal CK2 from the second logic level (L level) to the first logic level (H level) so that the reversed output signal having the first logic level (H level) is outputted from the reversed output terminal Q/ of the second D-FF circuit 40-2. Accordingly, the second gate circuit 41-2 is closed so that the output signal from the second selector 41-2 is fixed at the first logic level (H level). At the time T2, since the first selector 42-1 selects the output signal from the first gate circuit 41-1 according to the logic level of the switch signal SEL having the second logic level (L Level), the first clock signal CK1 outputted from the first gate circuit 41-1 is selected and outputted to the driver 43 as the first selected signal SS1. Then, the driver activates the first clock signal CK1, and outputs it as the clocked signal CKo.

At a time T3, the logic level of the selection signal SL is changed from the second logic level (L level) to the first logic level (H level). Then, at a time T4, the selection signal SL having the first logic level (H level) is latched at the data input terminal D of the first D-FF circuit 40-1 in synchronism with the transition of the first clock signal CK1 from the second logic level (L level) to the first logic level (H level) so that the logic level of the output signal from the output terminal Q of the first D-FF circuit 40-1 is changed from the second logic level (L level) to the first logic level (H level). Accordingly, the first gate circuit 41-1 is closed so that the first selected signal SS1 from the first selector 41-1 is fixed at the first logic level (H level). On the other hand, at a time T5, the selection signal SL having the first logic level (H level) is latched at the data input terminal D of the second D-FF circuit 40-2 in synchronism with the transition of the second clock signal CK2 from the second logic level (L level) to the first logic level (H level) so that the reversed output signal having the second logic level (L level) is outputted from the reversed output terminal Q/ of the second D-FF circuit 40-2. Accordingly, the second gate circuit 41-2 is opened so that the second clock signal CK2 is transferred to the first selector 42-1.

Under this circumstance, since the switch signal SEL maintains its logic level at the second logic level (L level), the first selector 42-1 keeps selecting the output signal from the first gate circuit 41-1 and outputting it as the first selected signal SS1. Therefore, since the logic level of the output signal from the first gate circuit 41-1 has been fixed at the first logic level (H level) at the time T5, the output signal maintaining the first logic level (H level) is selected by the first selector 42-1 and sent it to the driver 43 as the first selected signal SS1. Then, it is activated by the driver, and activated signal having the first logic level (H level) is outputted form the driver 43 as the clocked signal CKo, and maintains its logic level for a particular period. On the other hand, in the third D-FF circuit 40-3, the selection signal SL having the first logic level (H level) is transferred to the fourth D-FF circuit 40-4 at the time T4 in synchronism with the transition of the first clock signal CK1 from the second logic level (L level) to the first logic level (H level). Then, the selection signal SL having the first logic level (H level), which is outputted from the output terminal Q of the third D-FF circuit 40-3, is outputted from the output terminal Q of the fourth D-FF circuit 40-4 as the switch signal SEL at the time T5 in synchronism with the transition of the second clock signal CK2 from the second logic level (L level) to the first logic level (H level). That is, at the time T5, the logic level of the switch signal is changed from the second logic level (L level) to the first logic level (H level). Since the first selector 42-1 switches to the second clock signal CK2 in response to the transition of the second clock signal CK2 from the second logic level (L level) to the first logic level (H level), the hazard is not appeared on the clocked signal CKo.

According to the second embodiment of the invention, since the transition of the selection signal SL is detected by the third and the fourth D-FF circuits, and then the logic level of the switch signal SEL is changed in synchronism with the first and second clock signals CK1 and CK2, the following benefits can be expected.

(1) No hazard appears on the clocked signal CKo, which is outputted when the first clock signal CK1 is switched to the second clock signal CK2.

(2) Compared with the first embodiment, the clock signal switching circuit 300 according to a second embodiment does not depend on the phase difference between the first and second clock signals. Therefore, the clock signal switching circuit 300 can be used for any kinds of circuits using clock signals.

While the invention has been described with reference to illustrative embodiments, this description is not intended to be construed in a limiting sense. For example, in both first and second embodiments, these cases that two clock signal CK1 and CL2 are switched, are explained. However, the invention can be used for switching more than three clock signals. When three clock signals CK1, CK2 and CK3 are switched in the first embodiment, the selectors 20-1 and 20-2 are replaced to three-input and one-output selectors, respectively, and trinary selection signal is used. Further, a third control signal generating circuit, which receives a detection signal and the third clock signal and outputs the third control signal ST3 to the second selector 20-2 having three inputs, is formed in the control signal generating circuit 220. So, one of the three clock signals CK1, CK2 and CK3 can be selected by the trinary selection signal.

Further, when three clock signals CK1, CK2 and CK3 are switched in the second embodiment, an additional D-FF circuit and an additional gate circuit (ex. OR gate) are formed in the selection circuit 310, and the selector 42-1 is replaced to a three input and one output selector.

Various other modifications of the illustrated embodiments, as well as other embodiments of the invention, will be apparent to those skilled in the art on reference to this description. Therefore, the appended claims are intended to cover any such modifications or embodiments as fall within the true scope of the invention.

What I claim is:

1. A clock signal switching circuit receiving at least two clock signals having a phase difference between them, and an original signal for switching between the clock signals, and generating an output signal by selecting one of them, comprising:

a detection circuit receiving the original signal, the detection circuit forming a detection signal when a transition between the first and the second logic level of the original signal is detected;

a delay circuit receiving the original signal and the detection signal, the original signal passes through the delay circuit when the original signal maintains its logic level, and the delay circuit outputting and delaying a selection signal when the detection circuit receives the detection signal;

a first selector receiving the clock signals, selecting one of the clock signals according to the logic level of the selection signal, and outputting a first selected signal;

a second selector receiving a first control signal and a second control signal, selecting one of the control signals according to the logic level of the selection signal, and outputting a second selected signal, the logic level of the first control signal changing in response to one of the clock signals and the detection signal, and the logic level of the second control signal changing in response to the other clock signal and the detection signal; and a gate circuit receiving the first and second selected signals, generating the output signal;

wherein the logic level of the selection signal is changed by the delay circuit after the logic level of both of the first and second control signals has changed.

2. A clock signal switching circuit as claimed in claim 1, wherein the gate circuit has a logical sum function and outputs the output signal as a result of the function performed with the first and second selected signals.

3. A clock signal switching circuit receiving first and second clock signals having a phase difference between them, and a selection signal for switching between the clock signals, and generating an output signal by switching between the clock signals according to the logic level of a switch signal, comprising:

a first output control circuit receiving the selection signal and the first clock signal, the first output control circuit outputting a first signal having a fixed logic level in synchronism with the raising transition of the first clock signal when the selection signal is at a first logic level, and the first output control circuit outputting the first signal, which is the same as the first clock signal, when the selection signal is at a second logic level, maintaining the first signal which is the same as the first clock signal for a particular period starting when the logic level of the selection signal is change and ending when the first clock signal goes up;

a second output control circuit receiving the selection signal and the second clock signal, the second output control circuit outputting a second signal, which is the same as the second clock signal, in synchronism with the raising transition of the second clock signal when the selection signal is at a first logic level, and the second output control circuit outputting the second signal having a fixed logic level when the selection signal is at a second logic level, and, maintaining the second signal having the fixed logic level for a particular period starting when the logic level of the selection signal is change and ending when the second clock signal goes up;

a switch signal generating circuit, which receives the first and second clock signals and the selection signal, generating a switch signal, the switch signal generating circuit outputting the switch signal in response to a transition between the first and second logic level of either the first or the second clock signal after the logic level of the selection signal is changed; and a selector selecting and outputting one of the first and second signals according to the logic level of the switch signal as the output signal.

4. A clock signal switching circuit as claimed in claim 3, wherein the first output control circuit includes a first latch circuit, a first gate circuit having a logic sum function, the first latch circuit including a data input terminal for receiving the selection signal, a clock signal input terminal for receiving the first clock signal and an output terminal, and the first gate circuit receiving the first clock signal and an output signal from the output terminal of the first latch circuit and outputting the first signal as a result of the logic sum performed with the first clock signal and the output signal of the first latch circuit to the selector, and wherein the second output control circuit includes a second latch circuit and a second gate circuit having a logic sum function, the second latch circuit including a data input terminal for receiving the selection signal, a clock signal input terminal for receiving the second clock signal and an output terminal, and the second gate circuit receiving the second clock signal and an output signal from the output terminal of the second latch circuit and outputting the second signal as a result of the logic sum performed with the second clock signal and the output signal of the second latch circuit to the selector.

5. A clock signal switching circuit as claimed in claim 3, wherein the switch signal generating circuit includes a third latch circuit and a fourth latch circuit, the third latch circuit latching the selection signal and outputting it in response to a transition between the first and the second logic level of one of the first and second clock signals, which is selected by the switch signal, and the fourth latch circuit latching the output of the first latch circuit and outputting it as the switch signal in response to a transition between the first and the second logic level of the other clock signals, which is not selected by the switch signal.

6. A clock signal switching circuit as claimed in claim 5, wherein the switch signal generating circuit further includes a second selector receiving the first and second clock signals and a third selector receiving the first and second clock signals, the second selector selecting and outputting one of the first and second clock signals to the third latch circuit according to the logic level of the switch signal, the third selector selecting and outputting the other clock signal to the third latch circuit according to the logic level of the switch signal.

\* \* \* \* \*